Feb. 8, 1966    M. L. SLIPSON    3,233,338
DRYING APPARATUS

Filed Dec. 22, 1961    5 Sheets-Sheet 1

INVENTOR.
MARVIN L. SLIPSON.
BY
*Wallace P. Land*
ATTORNEY.

Feb. 8, 1966 M. L. SLIPSON 3,233,338
DRYING APPARATUS
Filed Dec. 22, 1961 5 Sheets-Sheet 2

INVENTOR.
MARVIN L. SLIPSON.
BY
ATTORNEY.

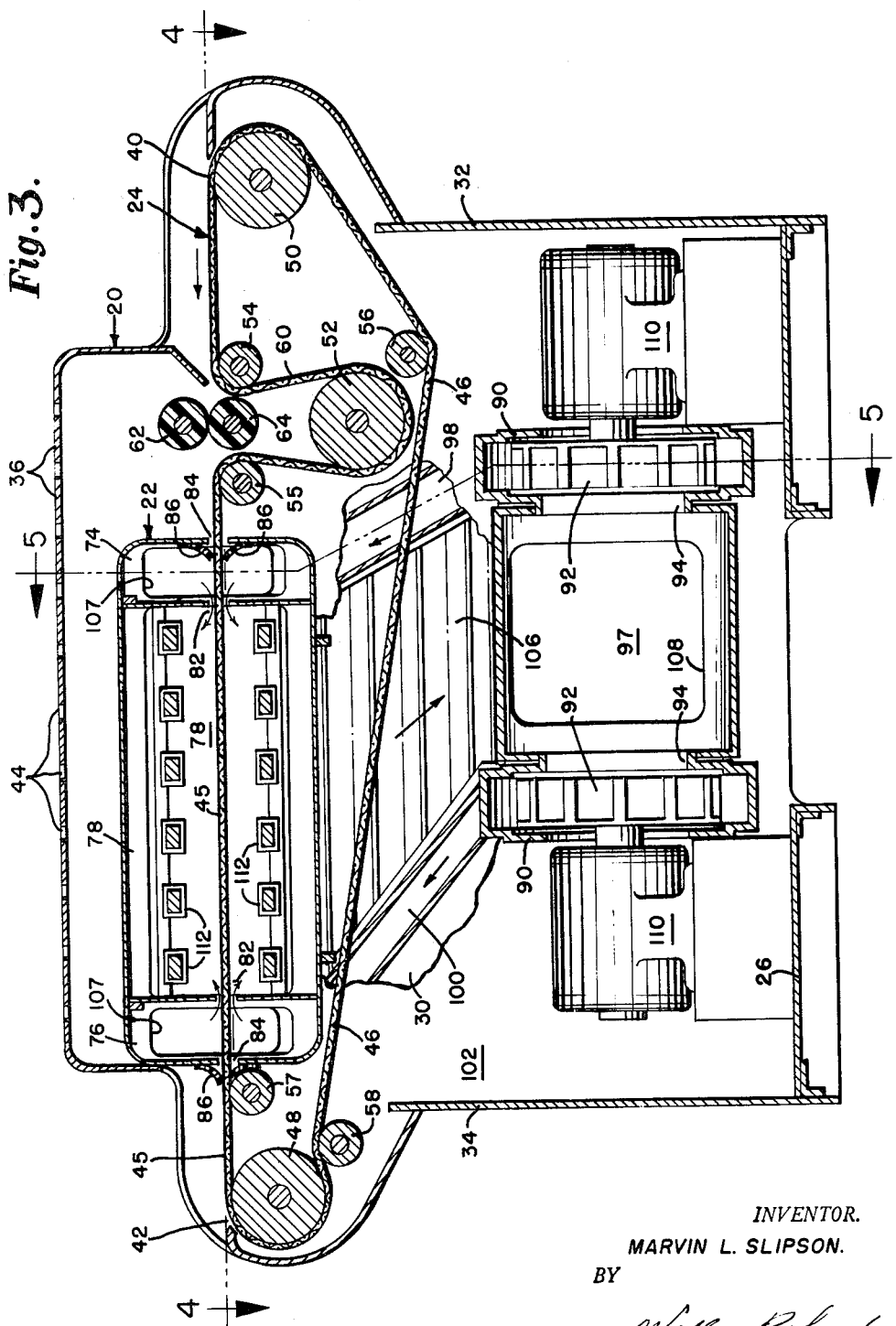

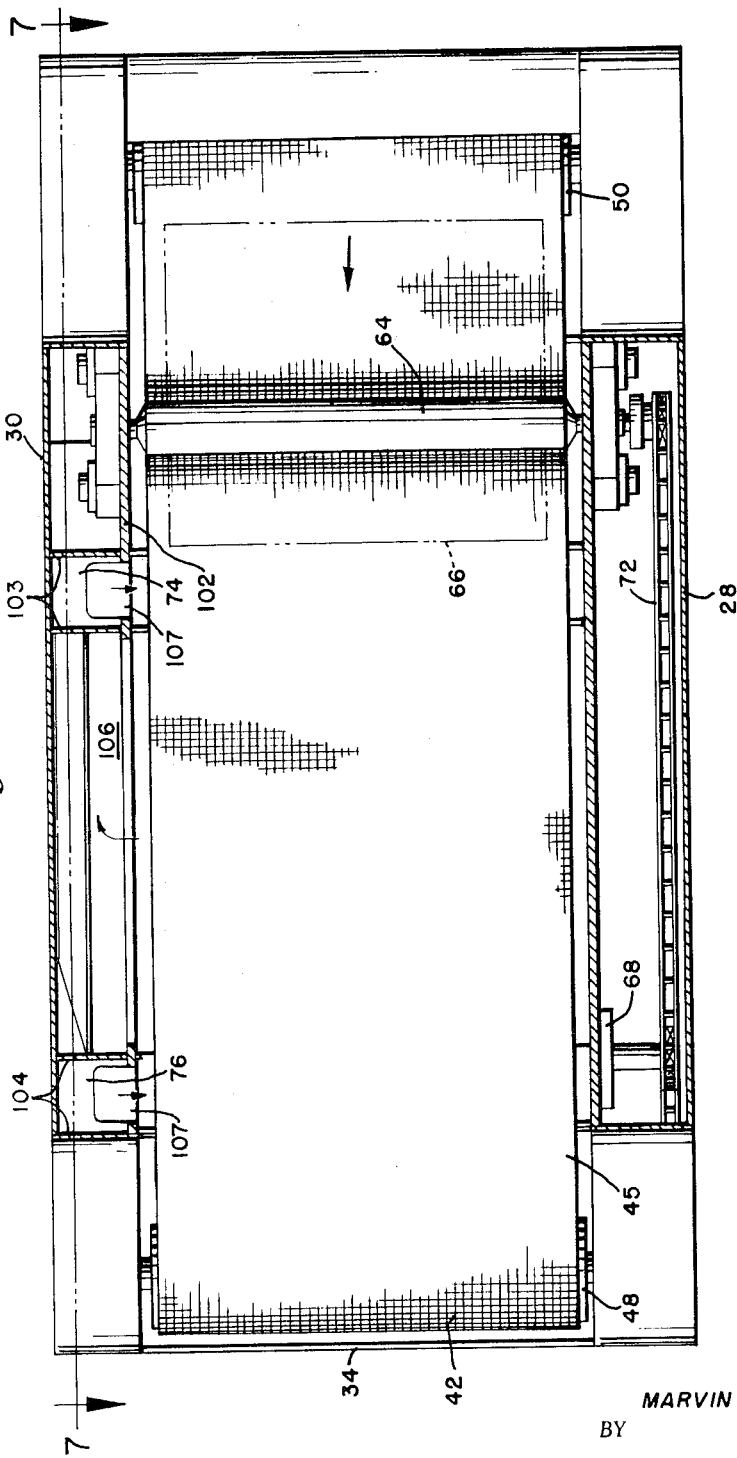

Feb. 8, 1966  M. L. SLIPSON  3,233,338
DRYING APPARATUS
Filed Dec. 22, 1961  5 Sheets-Sheet 5

INVENTOR.
MARVIN L. SLIPSON.
BY
Wallace P. Lamb
ATTORNEY.

United States Patent Office 3,233,338
Patented Feb. 8, 1966

3,233,338
DRYING APPARATUS
Marvin L. Slipson, Oak Park, Mich., assignor to Burroughs Corporation, Detroit, Mich., a corporation of Michigan
Filed Dec. 22, 1961, Ser. No. 161,657
3 Claims. (Cl. 34—77)

This invention relates generally to parts drying apparatus and particularly to a moisture removing closed air circulatory system therefor.

It is the principal object of the invention to provide an improved high production parts drying apparatus for association with a parts washer.

Another object of the invention is to provide an improved parts drying apparatus of a character such that the parts dried thereby will be free of so-called water marks caused by mineral and other residue of washing solutions.

Another object of the invention is to provide an improved parts drying apparatus in which the conventional practice of using heaters for vaporizing moisture are eliminated together with the accompanying warping of the parts.

Another object of the invention is to provide an air circulatory, moisture extracting system for a parts dryer which system is closed to room air so as to avoid intake and deposit of dust on the parts.

A further object of the invention resides in the provision of an improved parts dryer in which all of the moisture vapor is removed from the parts by a closed air circulatory system and condensed out of the closed system.

Other objects of the invention will become apparent from the following detail description, taken in connection with the accompanying drawings in which:

FIG. 3 is a vertical sectional view, taken along the line 3—3 of FIG. 2;

FIG. 4 is a horizontal sectional view, taken along the line 4—4 of FIG. 3;

Figure 1:
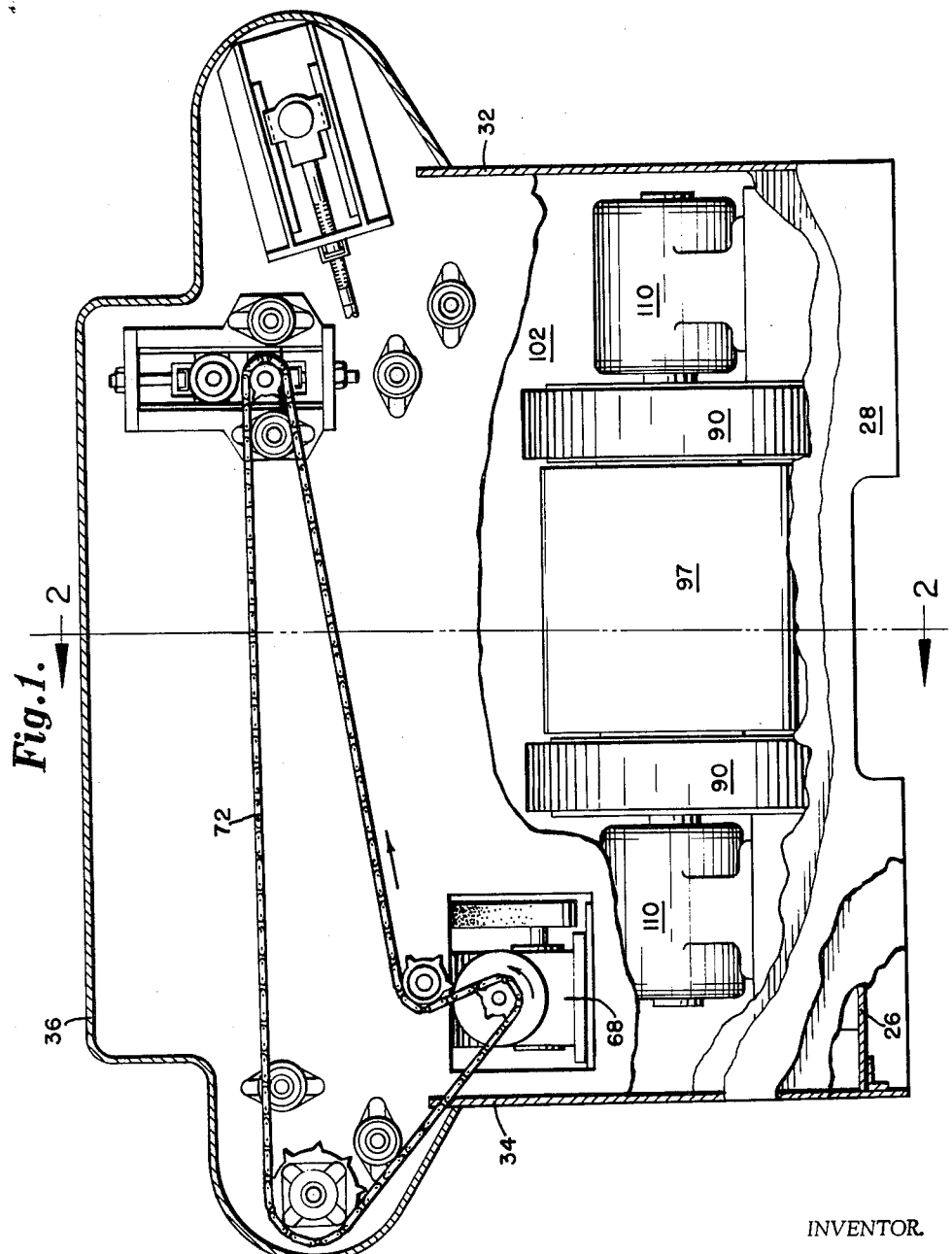
FIG. 1 is a side view, partly broken away and in section of a parts dryer, embodying features of the invention.
Figure 2:
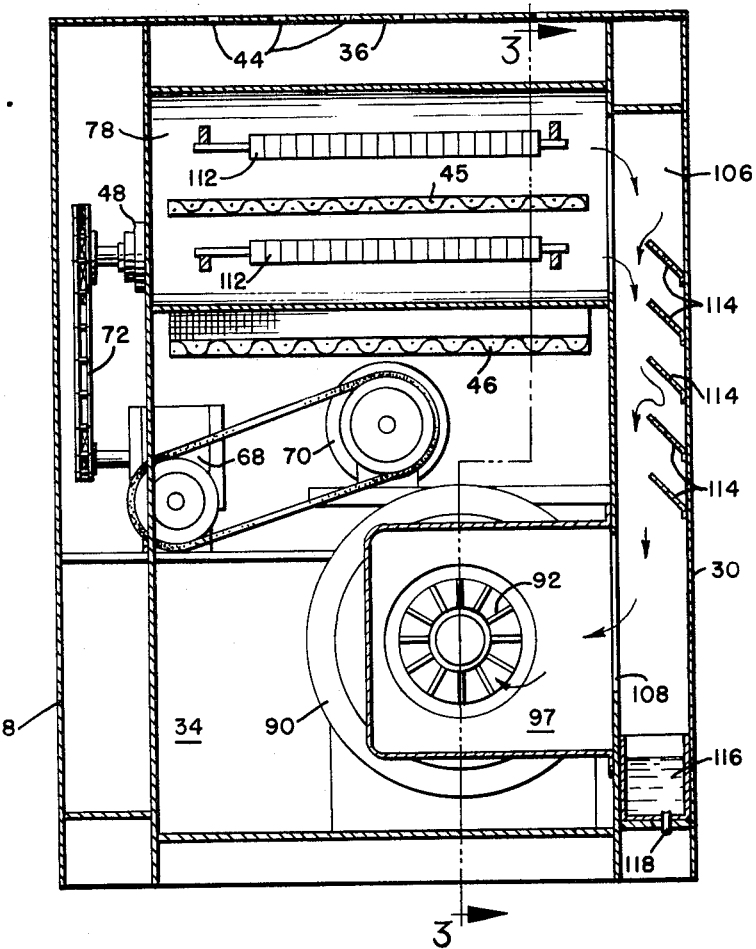
FIG. 2 is a cross sectional view, taken along the line 2—2 of FIG. 1.

Referring to the drawings by characters of reference, the parts drying apparatus comprises, in general, a supporting means or housing 20, a closed air circulatory system 22, and a parts conveyor 24. The air circulatory system 22 and the conveyor 24 are both mounted on and within the housing 20, the conveyor being horizontally disposed adjacent the top of the housing and arranged to pass through an upper portion of the air circulatory system.

The housing 20 is an elongated box-like structure having a bottom wall 26, side walls 28 and 30, end walls 32 and 34, and a top wall 36. In the opposite end walls 32 and 34, openings are provided to receive the feed and discharge ends 40 and 42 respectively of the parts conveyor. In the housing top wall 36, air vents 44 are provided for the escape of heat from the housing.

Figure 6:
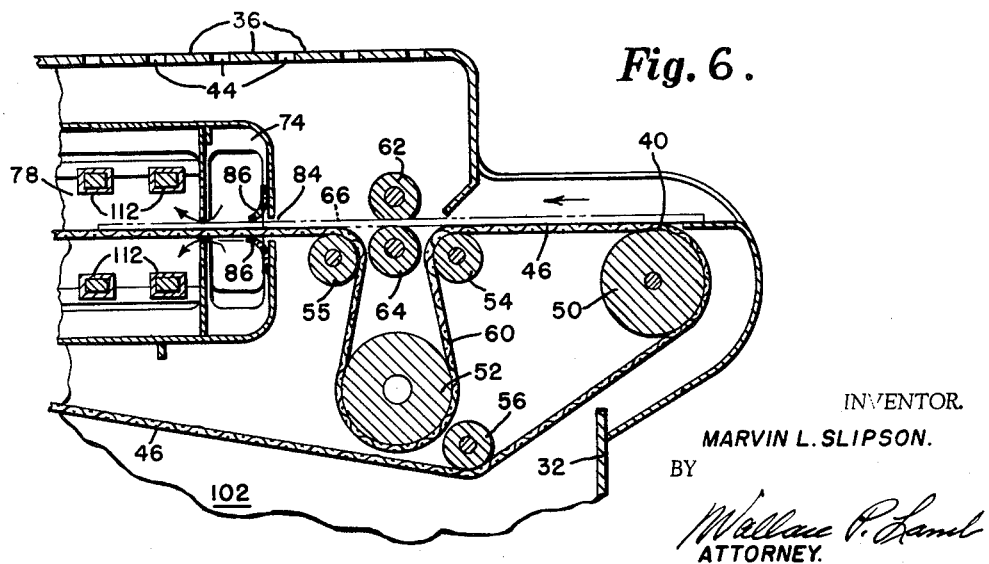
FIG. 6 is a fragmentary detail sectional view.
Figure 5:
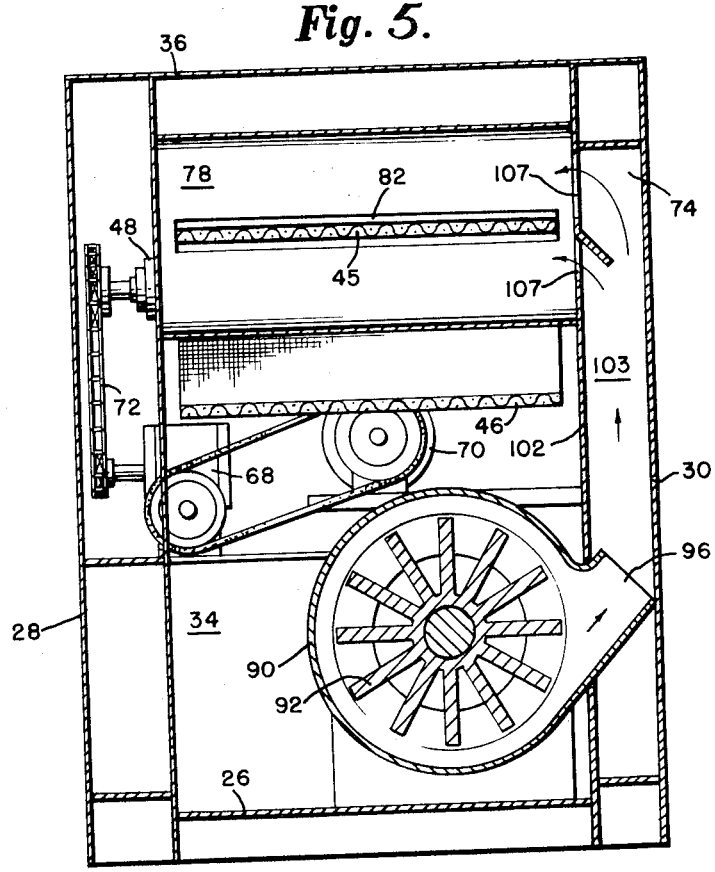
FIG. 5 is a vertical cross sectional view similar to FIG. 2 and taken along the line 5—5 of FIG. 3.
Figure 7:
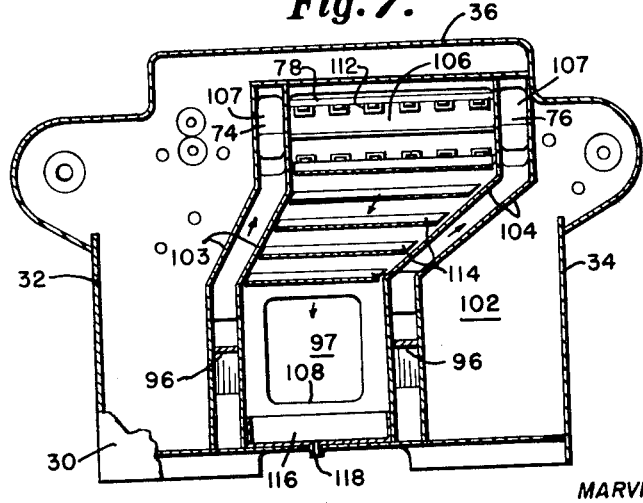
FIG. 7 is a vertical sectional view, taken along the line 7—7 of FIG. 2.

The conveyor 24 comprises an endless belt having an upper lead side 45 and a lower trailing side 46 guided by a driving roller 48, a driven roller 50, an intermediate roller 52 and several smaller guide rollers 54, 55, 56, 57 and 58. The rollers 54, 55 and 56 are arranged, near the feed end 40 of the conveyor, in a manner to guide the lead side of the belt in a downwardly directed loop 60 to provide clearance for the lower one of a pair of squeegee rollers 62 and 64, arranged vertically such that the bight thereof is substantially coplaner with the upper surface of the lead side of the belt. The squeegee rollers 62 and 64 are particularly useful in removing the greater part of the wash water from flat parts, such as printed circuit boards, one of which is designated by the numeral 66 in FIG. 6. Any suitable air pervious conveyor belt may be used, such as a conventional link or woven wire mesh belt. The conveyor belt and the squeegee rollers 62 and 64 are driven through a speed reduction mechanism 68 by an electric motor 70, the speed reduction mechanism, the belt driving roller 48, and the shaft of squeegee roller 64 having sprockets connected by a chain drive 72, driven by the motor.

The closed air circulatory system 22 includes a plenum chamber structure having a pair of air inlet chambers 74 and 76 which are spaced apart longitudinally of the parts belt by a larger capacity intermediate parts drying chamber 78, the chambers 74, 76 being separated from the chamber 78 by partitions 79. The air inlet chambers 74 and 76 are in communication with the parts drying chamber 78 by air restricting passages in the form of horizontal slots 82 through which also passes the lead or parts carrying side 44 of the conveyor belt. In the outer end walls of the air inlet chambers 74 and 76 are provided slot-like clearance apertures 84 for the lead side 44 of the conveyor belt, these openings being closed by resilient closure members or flaps 86.

Within the housing 20 and mounted on the bottom wall thereof is a pair of blowers, each comprising a scroll housing 90 containing a rotary blower wheel 92 having an air intake 94 and an air discharge 96. The air intakes 94 of the pair of blowers are in communication with a common air intake chamber 97 between the blowers, and the outlets 96 of the blowers are in communication respectively with the plenum inlet chambers 74, 76 by ducts 98 and 100. An inner vertical partition 102, in cooperation with the housing side wall 30 and pairs of partitions 103 and 104, form the ducts 98 and 100. Between the air supply ducts 98 and 100 there is an intermediate air return duct 106, which establishes communication between the air outlet of chamber 78 and the common intake chamber 97 of the blowers. At their upper ends, the air supply ducts 98 and 100 are in communication with the plenum inlet chambers 74 and 76 through openings 107 in the partition 102. At its lower end, the air return duct 106 is in communication with the common air intake chamber 97 through a large air inlet 108 in the vertical partition 102. Individual electric motors 110 may be used to drive the rotary blowers 92 continuously.

Within the parts drying chamber 78 there is a plurality of electric heating elements 112, preferably arranged in rows with a number of the rows of heating elements disposed below the belt. The heating elements 112 may be of the electrical type and may be under the control of a conventional thermostat to maintain the temperature of the compartment 78 at a desired temperature below baking temperature or such that the temperature of the drying compartment 78 is higher than room temperature, but below baking temperature, or about 140° F. That is, it is not the function of the heaters 112 to bake off or vaporize water that may be on the boards 66, but instead to maintain a temperature differential between the drying compartment 78 and the housing side wall 30 which wall functions as a moisture vapor condenser and as one side of the air return duct. Preferably the relatively cold, heat dissipating surface of the housing side wall 30 is extended into the air return duct 106 by the heat conducting fins 14 secured to the side wall 30 in heat transfer relation therewith, the fins being preferably vertically spaced apart and extending inwardly and upwardly from wall 30, as air baffles. Moisture collecting on the condenser or housing side wall 30 flows by gravity down into a collector or moisture receptacle 116 at the bottom of and within an extension of the air return duct 106 below air intake 108, the receptacle having an open drain 118. The sub-atmospheric pressure maintained in the air return duct 106 by the blowers 92 prevent flow of water from the drain 118 until the height of the liquid in receptacle 116 exceeds that which the blowers are capable of lifting whereupon some moisture drains from the receptacle. Thus, it will be seen that the water vapor removed from the parts to be dried is condensed and removed from the closed air circulatory system at the drain without opening the system to room air.

*Operation*

In operation, the blowers 92 and the conveyor belt operate continuously, and flat parts, such as printed circuit boards which have been through a parts washer are fed onto the feed end 40 of the dryer conveyor. The board is first carried by the conveyor between the squeegee rollers 62 and 64 which remove most of the water from the top and bottom surfaces of the board and the board is then carried through the high pressure plenum chamber 74 into the heated low pressure chamber 78. In the chamber 78 all remaining moisture on the board surfaces is entrained by the expansion action of the air admitted to chamber 78 through the air restricting passages 82, and the moisture entrained air flows under the influence of the blowers 92 down the return duct 106 to the intakes of the blowers 92. As the air passes down the return duct 106, heat is given up by the air to the condenser fins 114 and the housing wall 30 whence the heat is dissipated to room atmosphere. This heat extraction causes moisture vapor entrained in the air to condense on the fins 114 and housing side wall 30 which moisture flows down said wall into the receptacle 116 and in this manner moisture is removed from the closed air circulatory system. As previously mentioned, the suction action of the blowers 92 will maintain a head of liquid which constitute a condensate plug in the receptacle, allowing only a slow draining of the liquid from drain 118 as the head tends to increase above the lifting capacity of the blowers. The condensate plug allows for removal of moisture from the air circulatory system while sealing the drain against intake of extraneous air into the system.

From the foregoing description it will now be appreciated that I have provided an improved parts dryer in which the parts are subjected to a relatively high temperature, low pressure portion of an enclosed air circulatory system wherein air expansion entrains all of the moisture vapor and residue from the parts so as to avoid the leaving of so-called water marks on the parts. In addition, I have provided an air expansion parts drying system in which the moisture is being constantly removed from the closed system to maintain the air flowing through the parts drying chamber well below the saturation point. Furthermore, I have provided an improved parts dryer having an air circulatory system including a low pressure drying chamber which system is closed to room atmosphere to avoid intake of room air dust while at the same time having provisions for the removal of water from the closed system.

While I have shown and described my parts dryer in considerable detail, it will be understood that many changes and variations may be made therein without departing from the spirit and scope of the invention.

What is claimed is:

1. In a parts drying apparatus, an air inlet chamber, a parts drying chamber of greater capacity than said inlet chamber and in communication with said inlet chamber through an air restricting slot, a parts conveyor extending through said slot and said drying chamber, an air blower below said chambers, an air duct connecting the outlet of said blower to said inlet chamber, an air duct connecting the intake of said blower to said parts drying chamber and tapering from a relatively large inlet end at said parts dryer chamber to a relatively small outlet end at said blower, said chambers, ducts and blower forming a closed air circulatory system, a condenser forming in part said second mentioned duct, heat conducting baffle members within said second-mentioned duct and mounted in heat exchange relation with said condenser, a heater element within said parts drying chamber to maintain a predetermined temperature differential between said parts drying chamber and said condenser, and a water receptacle within said second-mentioned duct below the outlet of said blower.

2. In a parts drying apparatus, a parts drying chamber through which a parts carrying conveyor passes, said chamber having an air restricting inlet and an air outlet of larger flow capacity than said inlet, an air blower, an air supply duct connecting the outlet of said blower to the air restricting inlet of said chamber, an upright air return duct connecting the intake of said blower to the outlet of said chamber, said chamber, ducts and blower forming a closed air circulatory system, a condenser in heat exchange relation with said return duct to effect condensation of moisture vapor in air enroute to said blower, a heater arranged to heat said chamber to maintain a temperature differential between said chamber and said condenser, a condensate collector below and in communication with said condenser and having a drain, and an upright extension of said return duct connecting said return duct to said collector, said blower connected to said return duct laterally thereof between said condenser and said collector and a condensate plug in said collector having a liquid level maintained substantially constant by and corresponding to subatmospheric pressure created in said extension by said blower.

3. In a parts drying apparatus, a parts drying chamber through which a parts carrying conveyor travels, said chamber having an air restricting inlet and an air outlet of larger flow capacity than said inlet, an air blower, an air supply duct connecting the outlet of said blower to the air restricting passage, an upright tapered air return duct connected at the larger end thereof to the outlet of said chamber and at the smaller end to the intake of said blower, said return duct having an extension downwardly beyond the connection to the intake of said blower, said chamber, ducts and blower forming a closed air circulatory system, heat conducting air baffle members within said return duct above the connection of the latter with the intake of said blower, a housing enclosing the air circulatory system and having an upright wall forming at least a portion of the wall of said return duct as a condenser for dissipating the heat of condensation to atmosphere, said blower maintaining a subatmospheric pressure in said return duct, a heater within said chamber to maintain a temperature differential between said chamber and said condenser, and a condensate collector in said extension to receive the condensate having a flow restricting drain closed by condensate held in the drain under the influence of the subatmospheric pressure within said return duct during operation of said blower.

References Cited by the Examiner

UNITED STATES PATENTS

| | | | |
|---|---|---|---|
| 435,258 | 8/1890 | Peregrine | 34—77 |
| 1,018,992 | 2/1912 | Spenle | 34—77 |
| 2,005,580 | 6/1935 | Ferre | 34—77 X |
| 2,361,350 | 10/1944 | Keep | 34—242 X |
| 2,408,434 | 10/1946 | Mann et al. | 34—77 X |
| 2,484,527 | 10/1949 | Rhoads | 34—77 |

WILLIAM F. O'DEA, *Acting Primary Examiner.*

CHARLES E. O'CONNELL, NORMAN YUDKOFF,
*Examiners.*